US011656327B2

(12) United States Patent
Gilbertson et al.

(10) Patent No.: US 11,656,327 B2
(45) Date of Patent: May 23, 2023

(54) SENSOR WITH INTERNAL CLEANING

(71) Applicant: WAYMO LLC, Mountain View, CA (US)

(72) Inventors: Seth Gilbertson, Dublin, CA (US); Alexander Grinberg, Campbell, CA (US)

(73) Assignee: Waymo LLC, Mountain View, CA (US)

( * ) Notice: Subject to any disclaimer, the term of this patent is extended or adjusted under 35 U.S.C. 154(b) by 270 days.

(21) Appl. No.: 16/799,151

(22) Filed: Feb. 24, 2020

(65) Prior Publication Data

US 2021/0263133 A1    Aug. 26, 2021

(51) Int. Cl.

| G01S 7/40 | (2006.01) |
| G01S 13/86 | (2006.01) |
| B60S 1/56 | (2006.01) |
| G01S 13/931 | (2020.01) |
| G02B 27/00 | (2006.01) |
| H04N 5/225 | (2006.01) |

(52) U.S. Cl.
CPC ............ *G01S 7/4004* (2013.01); *B60S 1/566* (2013.01); *G01S 13/865* (2013.01); *G01S 13/867* (2013.01); *G01S 13/931* (2013.01); *G02B 27/0006* (2013.01); *H04N 5/2252* (2013.01); *H04N 5/22521* (2018.08); *G01S 7/4043* (2021.05); *G01S 2013/9327* (2020.01)

(58) Field of Classification Search
CPC .... G01S 7/4004; G01S 13/865; G01S 13/867; G01S 13/931; H04N 5/22521; H04N 5/2252; B60S 1/566; B60S 1/0848; B60S 1/0411; B60S 1/56; G02B 27/0006; B60R 11/04

USPC ..................................... 15/250.001; 348/335
See application file for complete search history.

(56) References Cited

U.S. PATENT DOCUMENTS

| 5,208,938 A | 5/1993 | Webb |
| 9,568,807 B2 | 2/2017 | Aldred et al. |
| 9,880,382 B1 | 1/2018 | Tippy et al. |
| 10,179,571 B1 | 1/2019 | Matesic et al. |
| 10,442,402 B2 | 10/2019 | Schmidt et al. |

(Continued)

FOREIGN PATENT DOCUMENTS

| JP | 2011153932 A | * | 8/2011 |
| JP | 2016155497 A | | 9/2016 |
| KR | 101704342 B1 | | 2/2017 |

OTHER PUBLICATIONS

International Search Report and Written Opinion for Application No. PCT/US21/70175 dated Jun. 14, 2021.

*Primary Examiner* — Katina N. Henson
(74) *Attorney, Agent, or Firm* — Botos Churchill IP Law

(57) ABSTRACT

Aspects of the disclosure relate to systems for cleaning a sensor. For example, the sensor may include a housing as well as internal sensor components housed within the housing. The housing may include a sensor input surface through which signals may pass. The system may also include a motor configured to rotate the internal sensor components relative to a mount as well as the mount to which the motor is fixed. The system may also include a wiper including a wiper blade. The wiper may be attached to the mount such that rotating the housing causes the wiper to contact the sensor input surface in order to clean the sensor.

22 Claims, 8 Drawing Sheets

(56) References Cited

U.S. PATENT DOCUMENTS

| | | | |
|---|---|---|---|
| 2014/0036132 A1* | 2/2014 | Pawlowski | G02B 27/0006 |
| | | | 348/335 |
| 2016/0121855 A1 | 5/2016 | Doorley et al. | |
| 2018/0143298 A1* | 5/2018 | Newman | G08G 1/165 |
| 2018/0170319 A1* | 6/2018 | Schmidt | B60S 1/0818 |
| 2019/0232315 A1* | 8/2019 | Mousavi Ehteshami | |
| | | | G02B 27/0006 |

* cited by examiner

SENSOR WITH INTERNAL CLEANING

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include such LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, etc., which can cause a buildup of debris and contaminants on these sensors. Typically, the sensors include a housing to protect the internal sensor components of the sensors from the debris and contaminants, but over time, the housing itself may become dirty. As such, the functions of the sensor components may be impeded as signals transmitted and received by the internal sensor components are blocked by the debris and contaminants.

BRIEF SUMMARY

One aspect of the disclosure provides a system for cleaning a sensor. The system includes the sensor, and the sensor includes a housing and internal sensor components housed within the housing. The housing also includes a sensor input surface through which signals may pass. The system also includes a motor configured to rotate the internal sensor components relative to a mount as well as the mount to which a portion of the motor is fixed. The system also includes a wiper including a wiper blade. The wiper is attached to the mount such that rotating the housing causes the wiper to contact the sensor input surface in order to clean the sensor.

In one example, the sensor input surface is a lens. In another example, the internal sensor components include a camera. In another example, the wiper blade is configured to remove debris from the internal sensor components. In another example, the system also includes a stopper arranged on the housing, the stopper being configured to prevent over rotation of the internal sensor components. In this example, the mount includes a protrusion configured to engage with the stopper in order to prevent over rotation of the internal sensor components. In another example, the mount further includes a nozzle arranged within the sensor housing and configured to direct fluid towards the sensor input surface when the sensor input surface is rotated towards the mount. In this example, the mount further includes a drain in order to allow fluid to exit the sensor. In another example, the system also includes an encoder configured to generate a signal identifying a location of one or more of the motor or the internal sensor components. In another example, the internal sensor components are configured to be rotated such that the sensor input surface is oriented towards the mount when the sensor is not in use collecting sensor data. In another example, the internal sensor components are configured to be rotated such that the sensor input surface is oriented away from the mount when the sensor is in use collecting sensor data. In another example, the system also includes a vehicle, and the sensor is mounted on the vehicle. In this example, the mount further includes a drain in order to allow fluid to exit the sensor externally of the vehicle. In another example, the portion is a stator of the motor. In another example, a rotor of the motor is connected to the internal sensor components in order to enable rotation of the internal sensor components. In another example, a rotor of the motor is connected to the housing in order to enable rotation of the housing. In another example, a pair of wipers are fixed adjacent to edges of the mount, and the pair of wipers includes the wiper. In another example, one or more edges of the mount include a sealing material arranged to keep fluid within the mount. In another example, the system also includes hardware configured to activate the wiper when the housing is in a particular position with respect to the mount in order to enable the wiper to engage with the sensor input surface. In this example, the hardware includes a solenoid. In another example, the sensor is configured for forward, rearward, or lateral mounting with respect to a vehicle.

DETAILED DESCRIPTION

Overview

Figure 1:
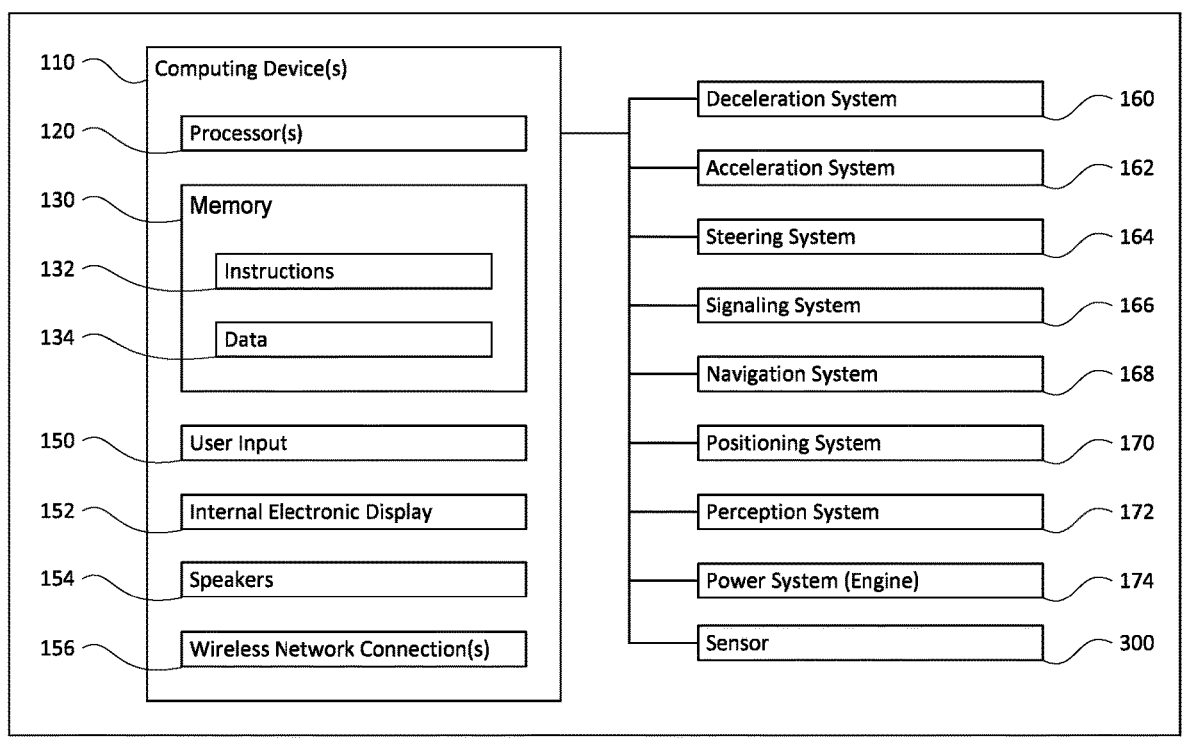
FIG. 1 is a functional diagram of an example vehicle in accordance with aspects of the disclosure.

This technology relates to clearing vehicle sensors of debris and contaminants to assure adequate operation. For instance, a sensor may include a housing to protect the internal sensor components from debris such as water, dirt, insects, and other contaminants. However, overtime, the housing sensor components may collect debris. As such, the functions of internal sensor components of the sensor may be impeded as signals transmitted and received by the internal sensor components may be blocked by the debris. To address this, debris may be cleared from a sensor by rotating the sensor. This rotation may enable one or more wipers to clear any debris on a sensor input surface of the sensor.

A sensor may be comprised of internal sensor components a housing for housing the sensor components. The housing may be configured in various shapes and sizes. The housing may be comprised of materials such as plastic, glass, polycarbonate, polystyrene, acrylic, polyester, etc. The sensor may be located internally or externally from a vehicle. The housing may include an opening through which the internal sensor components may transmit and receive signals. In this regard, the internal sensor components may include one or more imaging sensors such as LIDAR, radar, sonar, camera, or other such imaging sensors positioned within the housing of the sensor. In this regard, the internal sensor components may include a sensor input surface, such as a lens, mirror or other surface through which the signals pass in order to generate sensor data.

The sensor may be rotatable with respect to a mount. In this regard, as the sensor is rotated, the mount may remain stationary relative to the housing and internal sensor components of the sensor. To enable the rotation, the internal sensor components and/or housing may be attached to a motor. An encoder may be used to track the position of the motor and/or the internal sensor components. To ensure accurate positioning of the sensor with respect to the mount, one or more stoppers or protrusions may be used to prevent over-rotation of as well as to enable precise positioning of the sensor and internal sensor components. In addition, when the sensor is not in use collecting sensor data, sensor may be rotated within the mount in order to store and protect the internal sensor components.

The sensor may also include one or more wipers. The one or more wipers may be comprised of a wiper blade and a wiper support attached to a mount. The one or more wipers may be fixed, that is stationary relative to the mount, or alternatively, the one or more wipers may be movable within or with respect to the mount.

One or more nozzles may be arranged on the mount in order to spray fluid at the sensor input surface when oriented towards the mount. Each nozzle may be connected to a fluid reservoir as well as a pump in order to force fluid out of the nozzle as needed to assist in the cleaning of the sensor input surface.

The sensor may be mounted at various locations on a vehicle. Given the nature of the design of the sensor, the sensor may be forward, rearward, or side-facing and may also actively change its orientation relative to the vehicle. In some instances, the vehicle may have an autonomous driving mode that utilizes data generated by the sensor in order to make driving decisions for the vehicle. In addition, the sensor may replace other sensors on such vehicles thereby allowing for consistency of cleaning solutions and reduced costs to manufacture different types of cleaning systems for different sensors.

The features described herein may also allow for quick and effective cleaning of a sensor even when the sensor's lens or input surface becomes dirty. By doing such, the sensor may continue operation without significant interruption or the need for an individual to manually clean the sensor. As such, the sensor may continually operate in environments which produce a lot of debris, such as construction sites or off-road locations.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having a heading that is oriented at an angle that is 20 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing device 110 to provide information to passengers within the vehicle 100. The vehicle may also include one or more wireless network connections 156 to facilitate communicates with devices remote from the vehicle and/or between various systems of the vehicle.

In one example, computing device 110 may be an autonomous driving computing system incorporated into vehicle 100. The autonomous driving computing system may be capable of communicating with various components and systems of the vehicle, for instance, wirelessly (via wireless network connections 156) and/or a wired connection (such as a controller area network bus or other communication bus). For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100. In addition or alternatively, each of these systems may include one or more computing devices having processors and memory, configured the same as or similarly to processors 120 and memory 130 of computing devices 110 in order to enable the functionalities of these systems as described here.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle 100. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

As an example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, speed, acceleration, rate of change of acceleration, deceleration, rate of change of deceleration, etc. The raw data from the sensors and/or the aforementioned characteristics can be quantified or arranged into a descriptive function, vector, and or bounding box and sent for further processing to the computing devices 110 periodically and continuously as it is generated by the perception system 172.

As discussed in further detail below, computing devices 110 may use the positioning system 170 to determine the vehicle's location and perception system 172 to detect and respond to objects when needed to reach the location safely.

Figure 2:
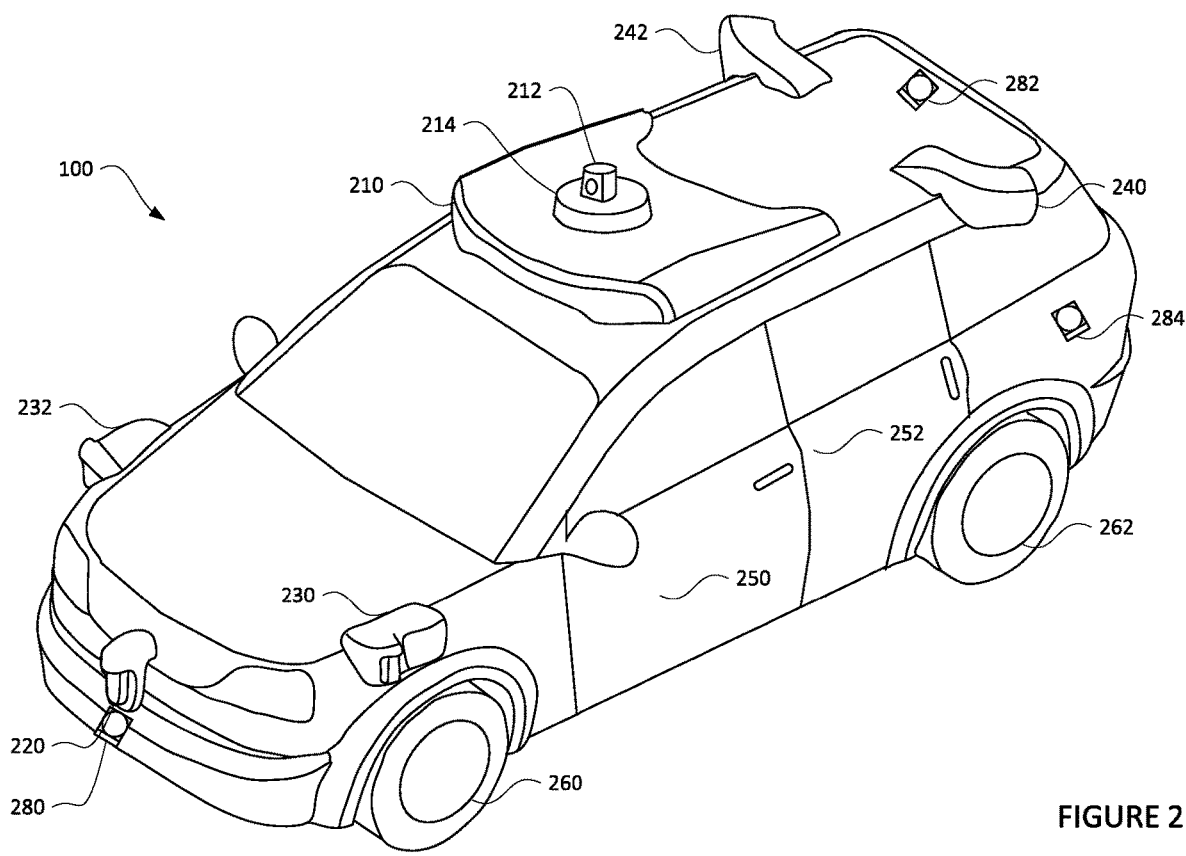
FIG. 2 is an example external view of a vehicle in accordance with aspects of the disclosure.

For instance, FIG. 2 is an example external view of vehicle 100. In this example, roof-top housing 210 and housings 212, 214 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 250. Vehicle 100 also includes housings 240, 242 for radar units and/or cameras also located on the roof of vehicle 100. Additional radar units and cameras may be located at the front and rear ends of vehicle 100 and/or on other positions along the roof or roof-top housing 210. For instance, sensors 280, 282, 284 are located at various positions on the vehicle 100. In addition, Vehicle 100 also includes many features of a typical passenger vehicle such as doors 250, 252, wheels 260, 262, etc.

Example Sensor

FIGS. 3-8 provide an example sensor 300 which may correspond to any of the sensors 280, 282, 284 which can function as a self-contained cleaning system for cleaning itself. The sensor 300 may be incorporated into the aforementioned perception system and/or may be configured to receive commands from the computing devices 110, for instance via a wired or wireless connection. The sensor 300 may include a housing 310 to protect the internal sensor components 320 (shown in dashed-line in FIG. 3 as they are internal to the housing 310) from debris such as water, dirt, insects, and other contaminants. However, over time, the housing and other sensor components may collect debris. As such, the functions of internal sensor components 320 may be impeded as signals transmitted and received by the internal sensor components may be blocked by the debris. To address this, debris may be cleared from the sensor 300 by rotating the internal sensor components 320 within the housing. This rotation may enable one or more wipers to clear any debris on a sensor input surface of the sensor.

Figure 3:
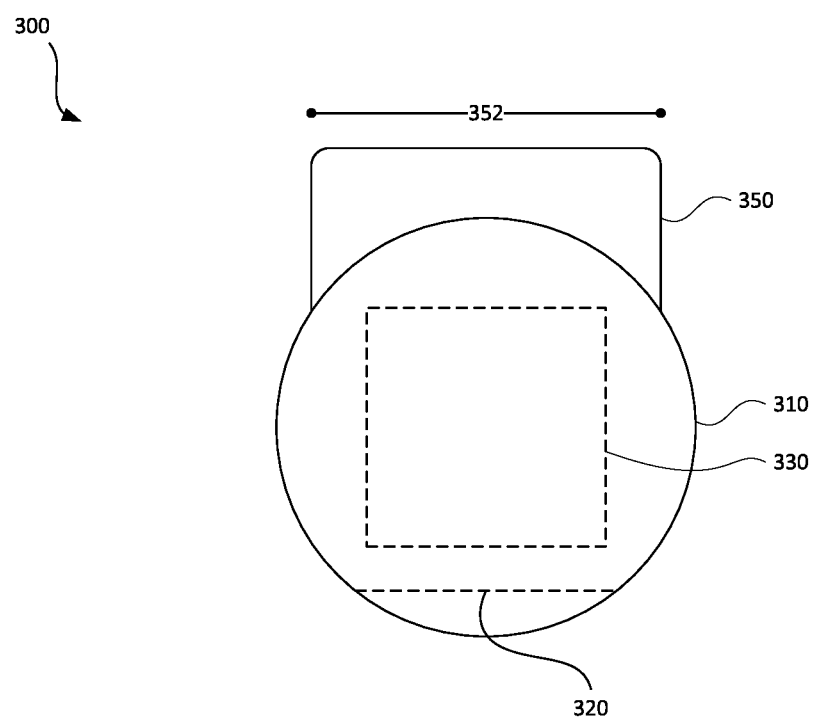
FIG. 3 is an example top-down perspective view of a sensor in accordance with aspects of the disclosure.
Figure 4:
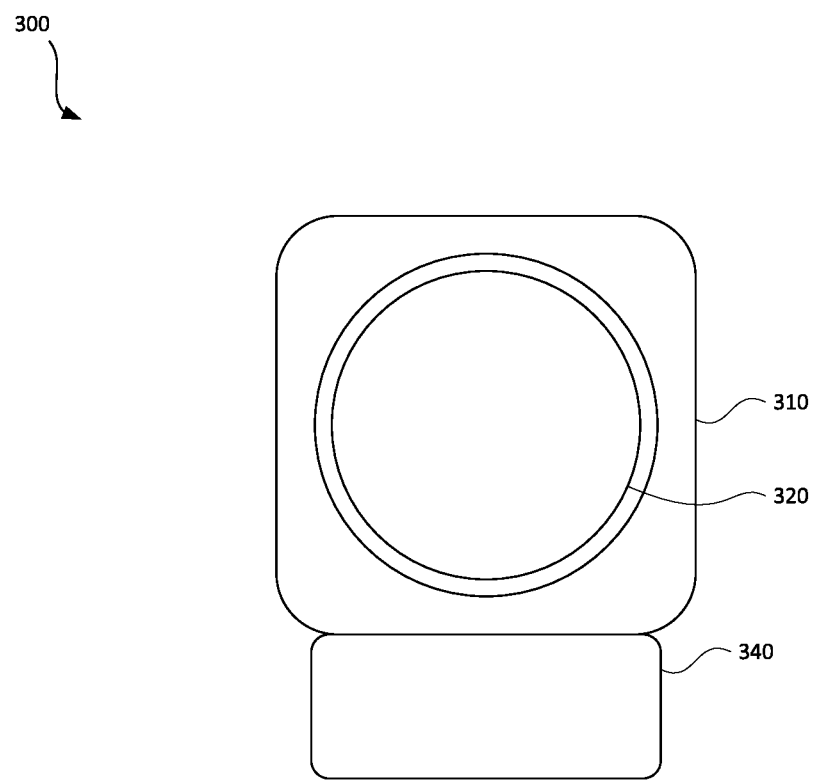
FIG. 4 is an example side perspective view of a sensor in accordance with aspects of the disclosure.
Figure 5:
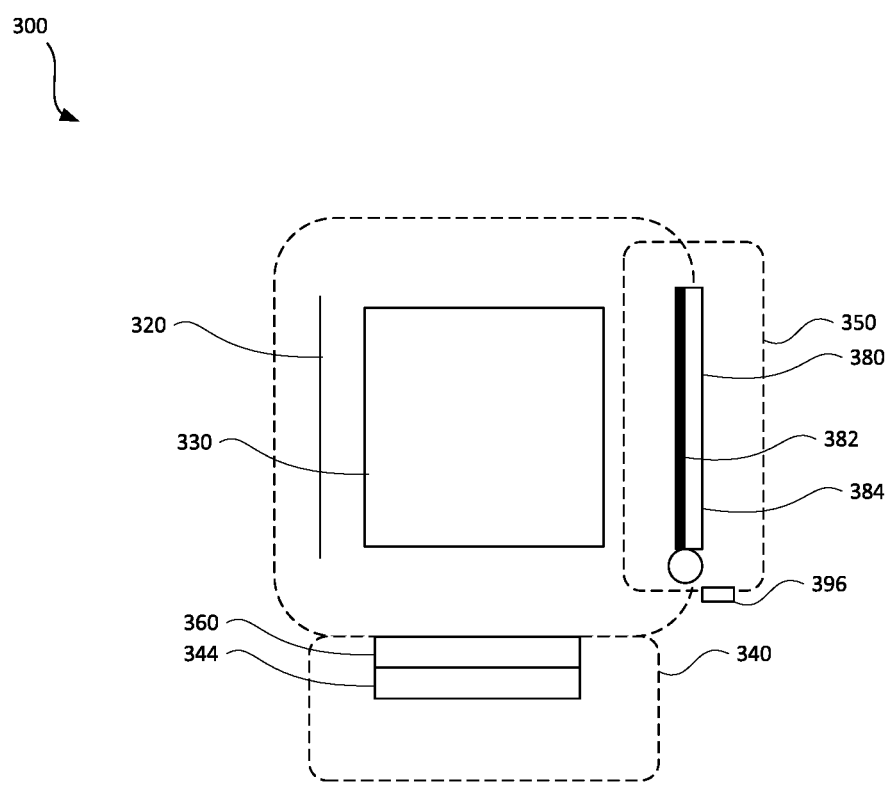
FIG. 5 is an example side cross-sectional view of a sensor in accordance with aspects of the disclosure.

The housing 310 may be configured in various shapes and sizes. As shown in the example of FIG. 3, the housing 310 is cylindrically shaped, but could also be spherical or partially spherical. The housing may be comprised of materials such as plastic, glass, polycarbonate, polystyrene, acrylic, polyester, etc. For instance, the housing may be a metal or plastic housing and the internal sensor components 320 have a "window" or sensor input surface 330 that allows the sensor to transmit and/or receive signals.

The internal sensor components 320 may transmit and receive one or more signals through the sensor input surface 330 (shown in dashed line in FIG. 3 as it is below portions of the sensor housing). In this regard, the internal sensor components may include one or more imaging sensors such as LIDAR, radar, sonar, camera, or other such imaging sensors positioned within the housing of the sensor. The sensor input surface may be a lens, mirror or other surface by which the signals can pass or are directed to other sensor components (e.g. a photodetector in the case of a camera) in order to generate sensor data.

The housing 310 and internal sensor components 320 may be rotatable. In this regard, as the internal sensor component are rotated, the housing 310 may also be rotated. To enable the rotation, the internal sensor components 320 and/or the housing 310 may be attached to a motor 340. A mount 350 may be attached to the vehicle such that a portion of the motor, for example a stator 342 of the motor 340, is fixed relative to the mount and the vehicle. In this regard, the mount 350 may remain fixed as the internal sensor components and housing 310 are rotated. Another portion of the motor, such as a rotor 344 of the motor 340, may be connected to the internal sensor components 320 and/or housing 310 in order to enable the rotation of the internal sensor components and housing relative to the mount 350. In one example, the internal sensor components may be fixed to the vehicle mount with a bearing assembly that allows rotation of the internal sensor components 320 and housing 310 but keeps other components of the sensor fixed.

As an alternative, the internal sensor components and the housing may be configured to rotate independently of one another. In this regard, all or a portion of the housing 310 may be transparent in order to enable signals to pass through the housing and to reach the internal sensor components 320. In addition, to enable independent rotation, a first motor may be configured to rotate the housing 310 and a second motor may be configured to rotate the internal sensor components. In this example, the housing may be rotated to enable cleaning while the internal sensor components may still function to capture signals and generate sensor data.

An encoder 360 (depicted in FIG. 5) may be used to track the position of the motor 340, housing 310, and/or the internal sensor components 320. In this regard, one or more processors, such as the one or more processors 120 or other similarly configured processors, may control the motor 340 based on feedback from the encoder 360. In this regard, the encoder may be configured to generate a signal identifying a location of one or more of the motor, housing, or the internal sensor components.

To ensure accurate positioning of the sensor, internal sensor components and/or housing with respect to the mount, one or more stoppers attached to the housing 310 and corresponding protrusions attached to the mount 350 may be used to prevent over-rotation of as well as to enable precise positioning of the sensor 300. The stoppers may be highly repeatable and rigid, allowing the internal sensor components to be driven relatively quickly to an exact position without overshooting that location. The motor 340 may also hold the internal sensor components and/or housing against the stopper such that a force can be continuously applied to keep the sensor stable. Using a stopper may also overcome the inaccuracies in the position of the internal sensor components caused by hysteresis. In some instances, the protrusion could also be actuated such that when disengaged, the internal sensor components 320 are free to rotate into any position.

For example, for two positions of the sensor, there may be a single stopper and a pair of protrusions on the mount and the cover. This pair may be placed such that they collide when the housing is at a desired position relative to the mount 350. Rotation in one direction would cause a collision of the stopper and one protrusion, for example, at a first location corresponding to an active location for the sensor to collect signals and generate sensor data. A second protrusion could be placed at a second desired position relative to the mount 350 where the window of the sensor would have to rotate past a wiper of the mount to reach the second protrusion corresponding to an inactive location for the sensor where the sensor has been cleaned. In some instances, the second and/or first protrusion may be activated by a solenoid or similar feature such that the first and/or second protrusion can be disengaged in order to allow the housing to rotate without interference. In addition or alternatively, the protrusions could be passively activated, for instance by being spring loaded such that the protrusions retract out of the way when struck in one direction but are rigid when struck from the opposite direction. This may allow the ability to have many hard stops in many positions rather than just in one or two locations.

Figure 6:
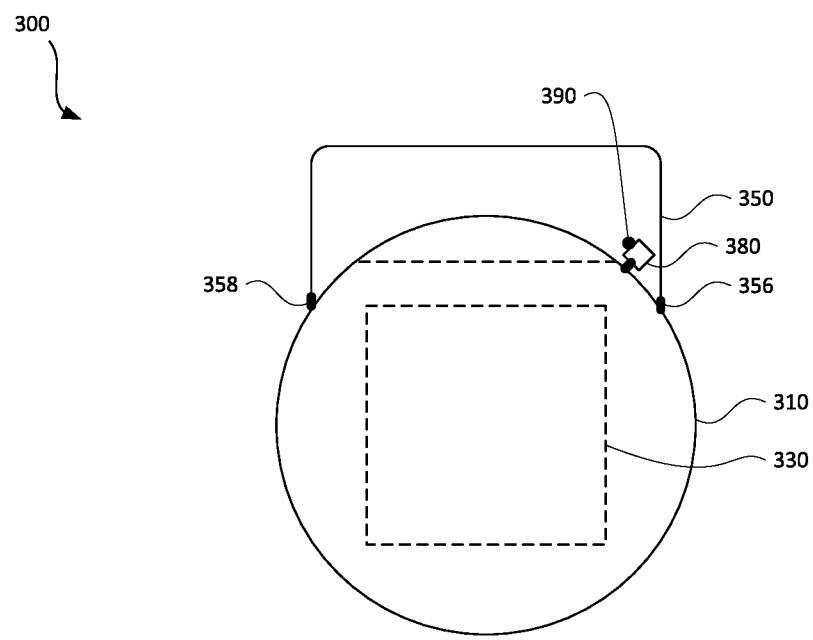
FIG. 6 is an example top-down cross-sectional view of a sensor with a fixed wiper in accordance with aspects of the disclosure.
Figure 7:
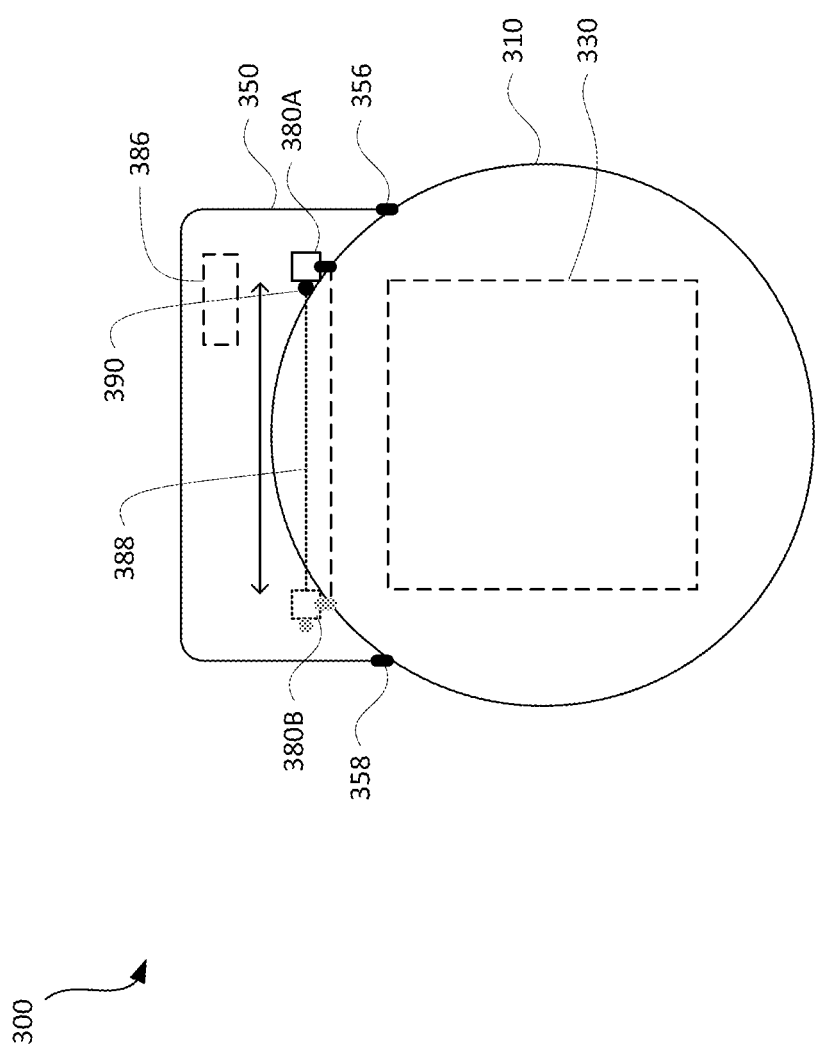
FIG. 7 is an example top-down cross-sectional view of a sensor with a movable wiper in accordance with aspects of the disclosure.
Figure 8:
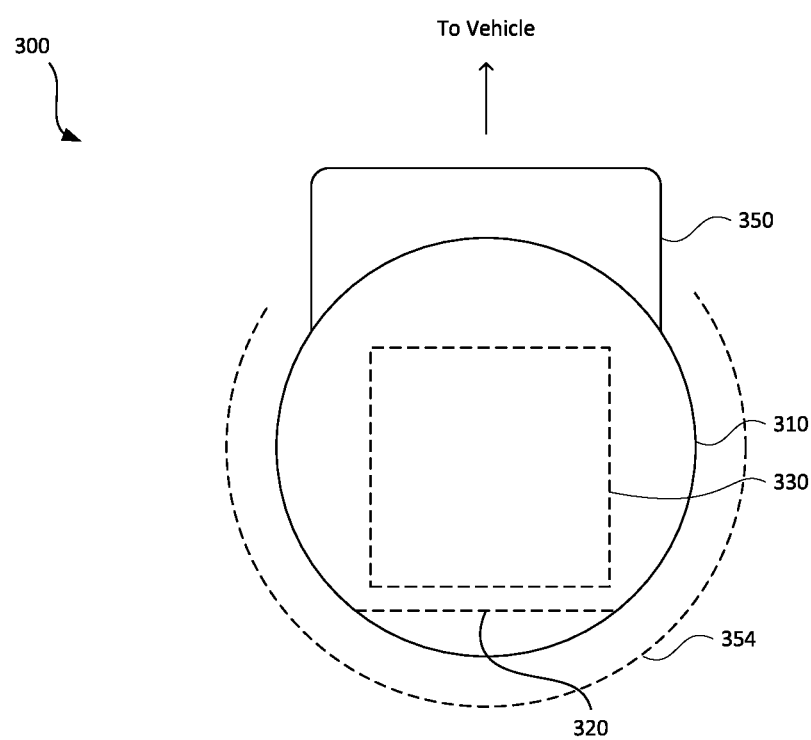
FIG. 8 is an example top-down view of a sensor in accordance with aspects of the disclosure.

Moreover, when the sensor 300 is not in use collecting sensor data (or rather, not collecting sensor data used to control the vehicle 100 or for other purposes), the internal sensor components 320 and housing 310 may be rotated in order to store and protect the sensor input surface 330. For example, the internal sensor components can be rotated such that the sensor input surface 330 is oriented towards the mount 350 as shown in FIGS. 6 and 7. This may protect the internal sensor components not only from debris, but also from minor impacts when the vehicle is not in use (i.e. parked). When in use, the sensor 300 may be rotated away from the mount 350 as shown in FIGS. 3, 4, 5 and 8. The width 352 of the mount 350 (shown in FIG. 3) may define the angles or orientations (represented by dashed-lines 354 in FIG. 8) at which the sensor is able to transmit and/or receive signal. For example, the angles may extend 180 degrees or more or less.

The sensor 300 may also include one or more wipers 380. The one or more wipers may be comprised of a wiper blade 382 and a wiper support 384 mounted to a surface of the mount 350 for instance using screws, clips or similar attachments. The wiper blade may be constructed from a linear piece of material which is attached to the wiper support. The wiper blade may be comprised of materials capable of removing debris, such as, such as rubber (for example, buna, ethylene propylene diene monomer or EPDM, silicone, etc.) or plastics (urethane, polyethylene, etc.). The wiper blade may also be comprised of a solid or sponge-like foam or fabric, such as a woven fabric, felted fabric, etc. In some embodiments each wiper may include multiple wiper blades.

The one or more wipers 380 may be fixed as depicted in FIG. 6, that is attached to and stationary relative to the mount 350. In this regard, rotation of the internal sensor components 320 may cause the sensor input surface 330 to contact one or more wiper blades of the one or more wipers (or vice versa) and thereby remove debris from the sensor input surface.

Alternatively, the one or more wipers may be movable within the housing. For instance, the mount 350 may include a second motor 386 configured to move the one or more wipers 380 from a first position (depicted as position 380A in FIG. 7) to a second position (depicted as position 380B in FIG. 7) and back again along a guide track 388. In this regard, FIG. 7 depicts a single wiper in two different positions at the same time. Again, the second motor 386 and the guide track 388 are depicted in dashed-line as they are arranged within the mount 350. The guide track 388 may include linear slides and a lead-screw type system driven by a motor, a solenoid, or pneumatic motion.

The shape of the sensor input surface 330 may be dictated by the cleaning method chosen. For instance, the sensor input surface may be round, oval, square, rectangular and/or curved or flat. At the same time, the one or more wipers may be configured to clear such surfaces. For example, a curved wiper blade may be used to clean a curved or flat surface, but a flat wiper blade would likely be more useful for cleaning a flat surface as compared to a curved surface. In addition, if the wiper is static, the sensor input surface should be proud of the housing to ensure only the sensor input surface is wiped clean by the one or more wipers.

One or more nozzles 390 may be attached to the one or more wipers 380 or the mount 350 in order to spray fluid at the sensor input surface 330 when within the housing 310. In this regard, the one or more nozzles may be configured to direct fluid towards the sensor input surface 330 when the sensor input surface is rotated towards the mount 350. As with the one or more wiper blades, the one or more nozzles may be stationary (as shown in FIG. 6) or movable (as shown in FIG. 7). In the example of movable nozzles, the nozzles may simply be attached to and move with the one or more wipers (see FIG. 7) or may be moved by the same or a different motor in the same or similar way as the one or more wipers.

Each nozzle may be connected, for instance via hose, to a fluid reservoir (not shown) as well as a pump (not shown) in order to force fluid out of the nozzle as needed to assist in the cleaning of the sensor input surface. The fluid may include air, water, and/or cleaning solutions including alcohol or other substances. The sensor 300 may also include drain 396 (shown in FIG. 5), port, or other opening that allows for the fluid to exit the mount 350. In this regard, the drain may be arranged at a lower portion of the mount in order to enable gravity to move fluid away from the sensor 300. In this regard, when mounted on a vehicle, such as vehicle 100, or other object, the fluid may drain externally to the vehicle or other object.

In some instances, edges 356, 358 of the mount 350 may include a strip of sealing material such as rubber, silicone or plastic in order to create a similar seal as shown in FIGS. 6 and 7. Alternatively, a pair of the one or more wipers may be fixed adjacent to edges 356, 358 of the mount 350. As with the above example, rotating the internal sensor components relative to the housing 310 and/or mount 350 cause the wiper blade of at least one of the pair of wipers to remove debris from the sensor input surface. In this regard, the blades may act as a seal, keeping fluid (e.g. liquids) inside of the mount 350.

The cleaning features (e.g. the one or more wipers and one or more nozzles) may also be fixed to the mount, in a location that does not interfere with the desired sensing area of the sensor. For instance, the cleaning system could be fixed such that each of the one or more wipers is mounted to a spring that would force the blade towards the sensor input surface and would wipe when the rotor 344 rotated the sensor input surface 330 past each of the one or more wipers. Alternatively, the one or more wipers could be actuated by hardware, for example a solenoid or another motor, such that once the sensor input surface 330 is in a particular position with respect to the mount (such as is depicted in FIGS. 6 and 7), the one or more wipers would then engage in the cleaning effort. The wiper would clean the system and when done disengage so the sensor was ready to be rotated back out to a usable position again.

As noted above, the sensor 300 may be mounted at various locations on a vehicle such as vehicle 100. For instance, the sensor may be mounted using for instance screws, bolts, clips or similar attachments. Given the nature of the design of the sensor 300, the sensor may be mounted in a forward (such as in the case of sensor 280), rearward (such as in the case of sensor 282), or lateral (e.g. side-facing, such as in the case of sensor 284) position with respect to the vehicle 100, and the sensor may also actively change its orientation relative to the vehicle by rotating as described above. In addition, the sensor 300 may replace other sensors on such vehicles thereby allowing for consistency of cleaning solutions and reduced costs to manufacture different types of cleaning systems for different sensors.

The features described herein may also allow for quick and effective cleaning of a sensor even when the sensor's lens or input surface becomes dirty. By doing such, the sensor may continue operation without significant interruption or the need for an individual to manually clean the sensor. As such, the sensor may continually operate in environments which produce a lot of debris, such as construction sites or off-road locations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for cleaning a sensor window, the system comprising:
   a sensor mount;
   a wiper connected to the sensor mount;
   a guide track arranged within the sensor mount;
   a sensor housing including the sensor window through which signals may pass;
   internal sensor components configured to send or receive the signals through the sensor window;
   a first motor connected to the sensor mount and the sensor housing, the first motor being configured to rotate the sensor housing relative to the sensor mount; and
   a second motor arranged within the sensor mount, the second motor being configured to move the wiper back and forth along the guide track between a first position and a second position in order to clean the sensor window.

2. The system of claim 1, wherein the sensor window is a lens.

3. The system of claim 1, wherein the internal sensor components include a camera.

4. The system of claim 1, wherein the wiper includes a wiper blade and a wiper support mounted to a surface of the sensor mount.

5. The system of claim 1, further comprising a stopper arranged on the sensor housing, the stopper being configured to prevent over rotation of the internal sensor components.

6. The system of claim 5, wherein the sensor mount includes a protrusion configured to engage with the stopper in order to prevent over rotation of the internal sensor components.

7. The system of claim 1, further comprising one or more nozzles arranged within the sensor housing and configured to direct fluid towards the sensor window when the sensor window is rotated towards the sensor mount.

8. The system of claim 7, wherein the sensor mount further includes a drain in order to allow fluid to exit the sensor housing.

9. The system of claim 1, wherein the internal sensor components are configured to be rotated such that the sensor window is oriented towards the sensor mount when the internal sensor components are not in use collecting sensor data.

10. The system of claim 1, wherein the internal sensor components are configured to be rotated such that the sensor window is oriented away from the sensor mount when the internal sensor components are in use collecting sensor data.

11. The system of claim 1, further comprising a vehicle, and wherein the sensor mount is mounted on the vehicle.

12. The system of claim 11, wherein the sensor mount further includes a drain in order to allow fluid to exit the sensor housing externally of the vehicle.

13. The system of claim 1, wherein a pair of wipers of the wiper are fixed adjacent to edges of the sensor mount.

14. The system of claim 1, wherein one or more edges of the sensor mount include a sealing material arranged to keep fluid within the sensor mount.

15. The system of claim 1, further comprising hardware configured to activate the wiper when the sensor housing is in a particular position with respect to the sensor mount in order to enable the wiper to engage with the sensor window.

16. The system of claim 15, wherein the hardware includes a solenoid.

17. The system of claim 1, wherein the system is configured for forward, rearward, or lateral mounting with respect to a vehicle.

18. A system for cleaning a sensor window, the system comprising:
   a sensor mount configured to attach to a vehicle;
   a wiper connected to the sensor mount;
   a housing including the sensor window through which signals may pass;
   internal sensor components configured to send or receive the signals through the sensor window;
   a first motor configured to rotate the housing relative to the sensor mount and the wiper, wherein when the first motor rotates the housing, the wiper contacts the sensor window in order to clean the sensor window; and
   a second motor configured to rotate the internal sensor components independent of the housing.

19. The system of claim 18, wherein the sensor mount further includes one or more nozzles arranged within the housing and configured to direct fluid towards the sensor window when the sensor window is rotated towards the sensor mount.

20. The system of claim 18, wherein the sensor mount further includes a drain in order to allow fluid to exit the housing.

21. A system for cleaning a sensor window, the system comprising:
   a sensor mount configured to attach to a vehicle;
   a housing including the sensor window through which signals may pass;
   internal sensor components configured to send or receive the signals through the sensor window;
   a first motor configured to rotate the housing relative to the sensor mount; and
   a second motor configured to rotate the internal sensor components.

22. The system of claim 21, further comprising one or more nozzles arranged within the housing and configured to direct fluid towards the sensor window.

* * * * *